(12) United States Patent
Eichenberger et al.

(10) Patent No.: US 8,014,354 B2
(45) Date of Patent: Sep. 6, 2011

(54) DYNAMICALLY CONFIGURED WIRELESS COMMUNICATIONS, FOR EXAMPLE, IN AUTOMATIC DATA COLLECTION ENVIRONMENT

(75) Inventors: John Eichenberger, Tulalip, WA (US); Marcus Albro, Arlington, WA (US)

(73) Assignee: Intermec IP Corp., Everett, WA (US)

( * ) Notice: Subject to any disclaimer, the term of this patent is extended or adjusted under 35 U.S.C. 154(b) by 498 days.

(21) Appl. No.: 12/253,678

(22) Filed: Oct. 17, 2008

(65) Prior Publication Data
US 2010/0097982 A1  Apr. 22, 2010

(51) Int. Cl.
*H04W 4/00* (2009.01)
(52) U.S. Cl. .......................................... 370/330; 455/436
(58) Field of Classification Search .................. None
See application file for complete search history.

(56) References Cited

U.S. PATENT DOCUMENTS

| | | | | |
|---|---|---|---|---|
| 5,946,621 A | * | 8/1999 | Chheda et al. | 455/440 |
| 7,139,575 B1 | * | 11/2006 | Chen et al. | 455/437 |
| 2007/0217384 A1 | * | 9/2007 | Mitani | 370/338 |
| 2008/0286400 A1 | * | 11/2008 | Morrill et al. | 425/424 |
| 2009/0080381 A1 | * | 3/2009 | Yashar et al. | 370/331 |
| 2009/0161626 A1 | * | 6/2009 | Crawford et al. | 370/331 |
| 2009/0312014 A1 | * | 12/2009 | Su et al. | 455/432.1 |
| 2009/0316658 A1 | * | 12/2009 | Kin | 370/332 |

* cited by examiner

*Primary Examiner* — Bob A Phunkulh
(74) *Attorney, Agent, or Firm* — Seed IP Law Group PLLC

(57) ABSTRACT

Dynamic configuration of a wireless environment, for example a wireless automatic data collection environment adjust various thresholds that trigger searching or scanning for new wireless access points (WAPs) and/or roaming. Thresholds may be increased or decreased based on various outcomes.

26 Claims, 6 Drawing Sheets

DYNAMICALLY CONFIGURED WIRELESS COMMUNICATIONS, FOR EXAMPLE, IN AUTOMATIC DATA COLLECTION ENVIRONMENT

BACKGROUND

1. Technical Field

The present disclosure generally relates to wireless communications and more particularly relates to networked wireless communications devices such as mobile computing devices.

2. Description of the Related Art

There are numerous fields that employ wireless communications. For example, the automatic data collection (ADC) field may employ wireless communications to communicatively couple one or more ADC devices, for example, mobile computing devices such as machine-readable symbol readers (e.g., barcode scanners), radio frequency identification (RFID) readers or interrogators, magnetic stripe readers, or other mobile computing devices. Wireless communications may allow handheld or mobile computing devices or clients to roam anywhere throughout an enterprise, without losing a network connection.

Wireless environments may include one or more wireless access points (WAPs) that are available to provide wireless communications, typically between a server or host and the handheld or mobile computing devices. From time to time, the mobile computing devices typically try to establish wireless communications with a WAP, which is commonly referred to as roaming. Often times the wireless environment is dynamic. The WAPs typically do not provide homogenous coverage throughout a given area. New WAPs may be added, or existing WAPs may be removed or moved. The signal strength of the WAPs may change from time-to-time, for example in response to a controller. Obstacles or other environmental factors may intermittently present interference with wireless communications.

Providing reliable wireless communications in a dynamic environment has proven to be a challenge. Reliability may be important for several reasons. Reliability may allow continuous wireless communications between the mobile computing device and one or more devices, servers, hosts, databases or networks. Increased reliability may allow mobile computing devices to require less storage (e.g., memory), thereby advantageously reducing cost, weight, and/or size of such devices. Enhanced reliability ensures that users of such devices will be efficient, and not having to wait for establishment of a network or other connection. Consequently, optimizing wireless communications in a dynamic wireless environment is highly desirable. Since establishing communications via a WAP with the strongest signal strength may enhance reliability, taking into account signal strengths of various available WAPs is also highly desirable.

BRIEF SUMMARY

A method of providing dynamically updated wireless communications may be summarized as including determining if a signal strength of a current wireless access point is below an adjustable search triggering signal strength threshold; searching for any additional wireless access points if the signal strength of the current wireless access point is determined to be below the adjustable search triggering signal strength threshold; determining if a signal strength of at least one new wireless access point located by the searching is at least equal to a roam triggering signal strength threshold; roaming if the signal strength of the at least one new wireless access point located by the searching is at least equal to the roam triggering signal strength threshold; and adjusting the adjustable search triggering signal strength threshold if no new wireless access point has a signal strength that is at least equal to the roam triggering signal strength threshold. Adjusting the adjustable scanning signal strength threshold if no new wireless access point has a signal strength that is at least equal to the roam triggering signal strength threshold may include decreasing the adjustable search triggering signal strength threshold.

The method may further include setting the roam triggering signal strength threshold based on a current value of the adjustable search triggering strength threshold. Setting the roam triggering signal strength threshold based on a signal strength of a current wireless access point with which wireless communications is established, for example a defined first margin above the current value of the signal strength.

The method may further include determining whether adjusting the adjustable search triggering signal strength threshold will make the adjustable search triggering signal strength threshold less than a defined minimum adjustable search triggering signal strength threshold value, wherein adjusting the adjustable search triggering signal strength threshold if no new wireless access point has a signal strength that is at least equal to the roam triggering signal strength threshold includes decreasing the adjustable search triggering signal strength threshold only if the decreasing will not make the adjustable search triggering signal strength threshold less than the defined minimum adjustable search triggering signal strength threshold value. Adjusting the adjustable scanning signal strength threshold if no new wireless access point has a signal strength that is at least equal to the roam triggering signal strength threshold may include adjusting the adjustable search triggering signal strength threshold if no new wireless access point has a signal strength that is at least equal to the roam triggering signal strength threshold over a first duration.

The method may further include determining if a signal strength of the current wireless access point is at least equal to an adjustment triggering signal strength threshold; and adjusting the adjustable search triggering signal strength threshold if the signal strength of the current wireless access point is at least equal to the adjustment triggering signal strength threshold. Adjusting the adjustable search triggering signal strength threshold if the signal strength of the current wireless access point is at least equal to the adjustment triggering signal strength threshold may include increasing the adjustable search trigger signal strength threshold if the signal strength of the current wireless access point is at least equal to the adjustment triggering signal strength threshold.

The method may further include setting the adjustment triggering signal strength threshold based on a current value of the adjustable search triggering strength threshold. Adjusting the adjustable search triggering signal strength threshold if the signal strength of the current wireless access point is at least equal to the adjustment triggering signal strength threshold may include adjusting the adjustable search trigger signal strength threshold if the signal strength of the current wireless access point is at least equal to the adjustment triggering signal strength threshold over a second duration.

The method may further include wirelessly communicating with a first wireless access point as the current wireless access point before roaming; and wirelessly communicating with a second wireless access point as the current wireless access point after roaming. Searching for any additional wireless access points if the signal strength of the current wireless access point is determined to be below the adjustable search triggering signal strength threshold may include scanning for additional wireless access points. Scanning for additional wireless access points may include scanning a first subset of available channels at a first rate. Scanning for additional wireless access points may include scanning a second subset of available channels at a second rate, lower than the first rate.

The method may further include performing a divide and truncate operation on the total number of available channels to define the size of at least the first and the second subsets.

The method may further include performing a divide by 3 and truncate operation on the total number of available channels to define the size of at least the first and the second subsets.

The method may further include including the one of the available channels that is currently used for wireless communications in the first subset.

The method may further include including a number of the available channels identified in an access point neighbor report in the first subset.

A wireless communications system may be summarized as including at least one antenna; at least one transmitter communicatively coupled to the at least one antenna; at least one receiver communicatively coupled to the at least one antenna; at least one control system communicatively coupled to the at least one transmitter and the at least one receive, the control system that dynamically updates wireless communications by: determining if a signal strength of a current wireless access point is below an adjustable search triggering signal strength threshold; searching for any additional wireless access points if the signal strength of the current wireless access point is determined to be below the adjustable search triggering signal strength threshold; determining if a signal strength of at least one new wireless access point located by the searching is at least equal to a roam triggering signal strength threshold; roaming if the signal strength of the at least one new wireless access point located by the searching is at least equal to the roam triggering signal strength threshold; and decreasing the adjustable search triggering signal strength threshold if no new wireless access point has a signal strength that is at least equal to the roam triggering signal strength threshold.

The wireless communications system wherein the control system may dynamically update wireless communications further by: setting the roam triggering signal strength threshold at a defined first margin above a signal strength of a current wireless access point with which wireless communications is currently established. The control system may decrease the adjustable search triggering signal strength threshold only if the decreasing will not make the adjustable search triggering signal strength threshold less than the defined minimum adjustable search triggering signal strength threshold value.

The wireless communications system wherein the control system may dynamically update wireless communications further by: determining if a signal strength of the current wireless access point is at least equal to the an adjustment triggering signal strength threshold; and increasing the adjustable search triggering signal strength threshold if the signal strength of the current wireless access point is at least equal to the adjustment triggering signal strength threshold.

The wireless communications system wherein the control system may dynamically update wireless communications further by: setting the roam triggering signal strength threshold at a defined second margin above the current signal strength value of the current wireless access point with which wireless communications is currently established.

The control system may search for additional wireless access points by scanning a first subset of available channels at a first rate for additional wireless access points and scanning a second subset of available channels at a second rate, lower than the first rate, for additional wireless access points.

The wireless communications system wherein the control system may dynamically update wireless communications further by: performing a divide and truncate operation on the total number of available channels to define the size of at least the first and the second subsets.

The wireless communications system wherein the control system may dynamically update wireless communications further by: including the one of the available channels that is currently used for wireless communications in the first subset; and including a number of the available channels identified in an access point neighbor report in the first subset. The control system may include at least one processor and at least one processor-readable storage medium that may store processor executable instructions to configure the processor.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with wireless access points, transmitters, receivers, transceivers, servers, routers, bridges, and other networking devices, as well as computing devices such as mobile computing devices have not been shown or described in detail to avoid unnecessarily obscuring descriptions of the embodiments.

Unless the context requires otherwise, throughout the specification and claims which follow, the word "comprise"

and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
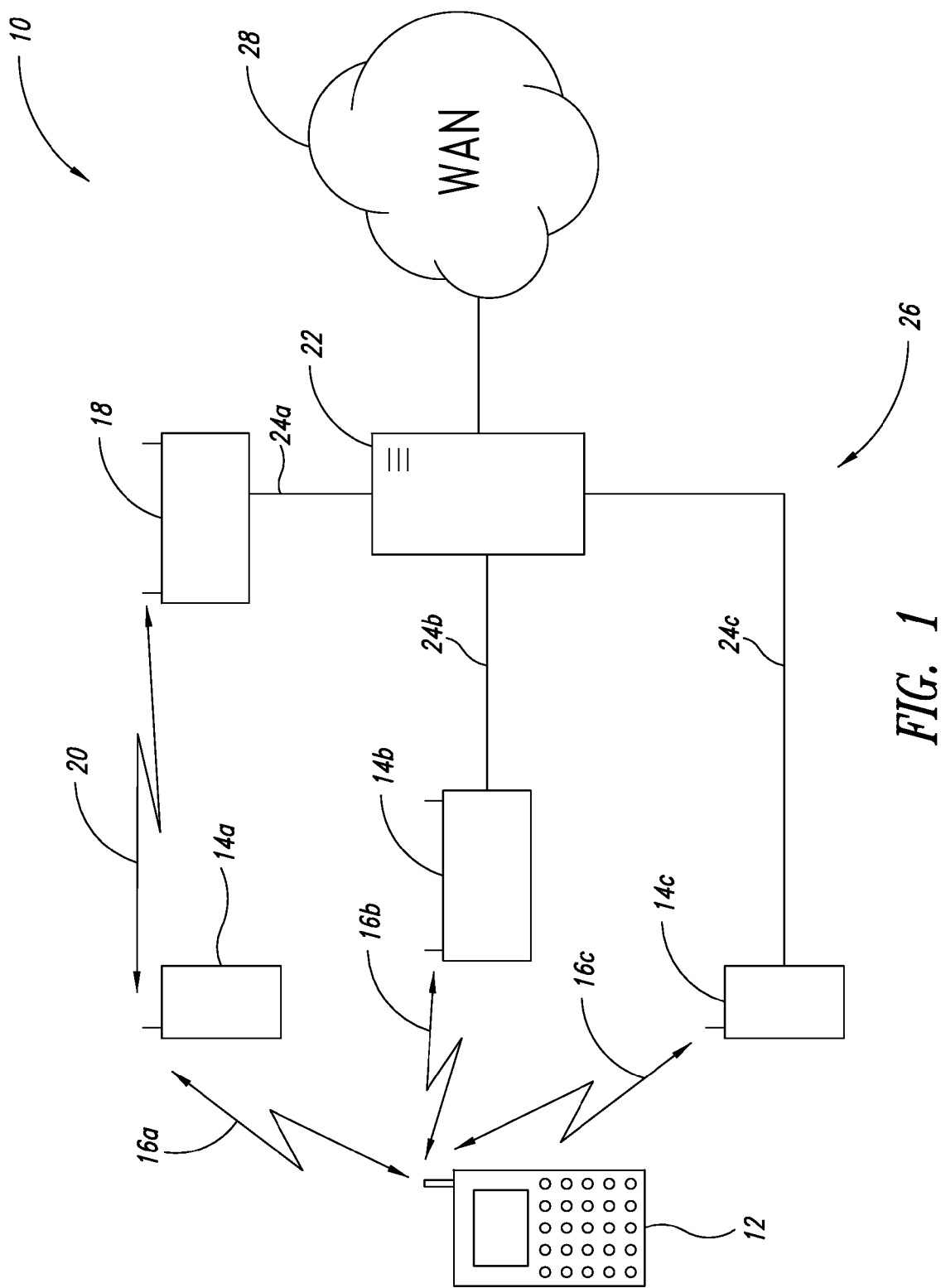
FIG. 1 is a schematic diagram of a wireless communications environment including a mobile computing client, a number of wireless access points, and a server forming a local area network, communicatively coupled to a wide area network, according to one illustrated embodiment.

FIG. 1 shows a wireless communications environment 10 according to one illustrated embodiment.

The wireless communications environment 10 may include one or more wireless communications devices, for example, one or more handheld or mobile computing devices or clients 12. The mobile computing devices or clients 12 can take a variety of forms. For example, the mobile computing devices or clients 12 may take the form of automatic data collection (ADC) devices configured for wireless communications, for example via a transmitter, receiver, or transceiver. Such transmitter, receiver or transceiver may be configured to perform wireless communications using one or more wireless communications protocols, for example the IEEE 802.11 protocol. Also for example, the mobile computing devices or clients 12 may take the form of personal digital assistants configured for wireless communications, for example via a transmitter, receiver, or transceiver. Examples of such include devices sold under the trademarks BLACKBERRY®, TREO®. As a further example, the mobile computing devices or clients 12 may take the form of laptop, or sub-laptop computers, configured for wireless communications. As an even further example, the mobile computing devices or clients 12 may take the form cellular phones or other devices that provide wireless communications via one or more cellular communications networks.

The wireless communications environment 10 may also include one or more wireless access points (WAPs) 14a-14c (collectively 14). The WAPs 14 may be positioned at various locations throughout the wireless communications environment 10. The WAPs 14 are operable to provide wireless communications indicated by double-headed arrows 16a-16c (collectively 16) with the one or more mobile computing devices or clients 12. In particular, the WAPs 14 may be configured to provide wireless communications using one or more wireless communications protocols, for example the IEEE 802.11 protocol. WAPs are commercially available from a large variety of sources, for instance Intermec Technologies.

The wireless communications environment 10 may also include one or more intermediary communications devices, such as a bridge or router 18. The bridge or router 18 may be configured to communicatively couple with one or more of the WAPs 14 via a wireless communications link illustrated by a double-headed arrow 20, or via a wired communications link (not illustrated in FIG. 1). The WAPs 14 may be communicatively coupled to one or more gateways or servers 22. For example, some of the WAPs 14a may be indirectly communicatively coupled to the gateway or server 22, for instance by the bridge or router 18, via a wired or wireless communications link 24a. Also for example, some of the WAPs 14b, 14c may be indirectly communicatively coupled to the gateway or server 22, for instance via a wired or wireless communications link 24b, 24c. The mobile computing device or client 12, WAPs 14, router 18, and gateway or server 22 may form a local area network (LAN) 26.

The gateway or server 22 may provide communications with another network, for example, a wide area network (WAN) 28, for instance, an intranet, extranet, or the Internet.

Figure 2:
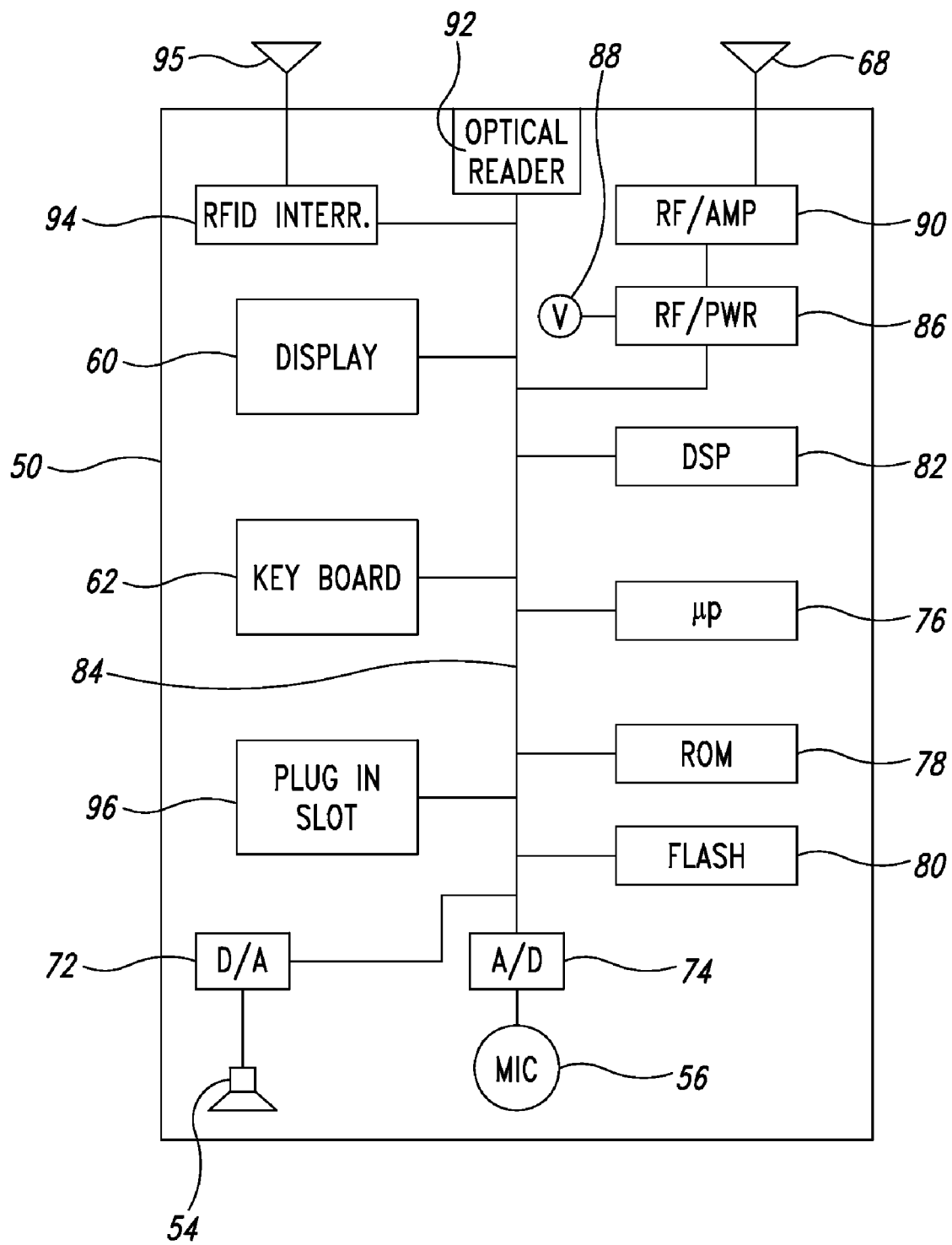
FIG. 2 is a functional block diagram of a mobile computing device, according to one illustrated embodiment.

FIG. 2 is a schematic view of the mobile computing device or client 12, according to one illustrated embodiment.

The mobile computing device or client 12 may include an input/output system. For example, the mobile computing device or client 12 may include a speaker 54 and a microphone 56. A digital-to-analog (D/A) converter 72 may convert digital signals to analog signals, for example analog signals suitable to drive the speaker 54. A digital-to-analog (A/D) converter 74 may convert analog signals to digital signals, for example analog signals from the microphone 56. The mobile computing device or client 12 may also include a display 60 to display information and/or user selectable icons, and a keyboard 62 configured to receive user keyed entries which may include instructions, information or data.

Operation of the mobile computing device or client 12 may be controlled by one or more processors, for example a microprocessor 76 which may execute instructions stored in one or more process-readable storage devices such as memories. Memories may take a variety of forms, for instance read only memory (ROM) 78 and/or flash memory 80. The ROM 78 may store basic instructions and/or data, while flash memory 80 may store less permanent instructions and/or data, such information scanned or otherwise read from ADC data carriers (e.g., barcode labels, RFID transponders, magnetic stripes, etc.). The mobile computing device or client 12 may also include a digital signal processor (DSP) 82, and/or other processing devices, for instance one or more programmable gate arrays, field programmable gate arrays, and/or application specific integrated circuits. The various components may be coupled by one or more buses, collectively 84. The buses 84 may include instructions buses, data buses, power buses, and any other type of bus that may be suitable in a mobile computing device 12.

The mobile computing device or client 12 further includes an RF and power section 86 which may control RF modulation and demodulation, as well as power related functions such as recharging a power source such as a rechargeable battery 88 and/or monitoring the rechargeable battery 88. The RF and power section 86 may be coupled to the antenna 68 via an RF amplifier section 90. While denominated as "RF" these sections may operate in the radio frequency or microwave ranges of the electromagnetic spectrum, and possibly other ranges. Thus the term "RF" is not intended to be limiting to any specific portion of the electromagnetic spectrum.

The mobile computing device or client 12 may include one or more ADC components that are operable to automatically read information from and/or write information to one or more ADC data carriers (e.g., barcode labels, RFID transponders, magnetic stripes, etc.).

For example, the mobile computing device or client 12 may include an optical reader 92 that automatically optically reads information encoded in a machine-readable symbol such as a barcode symbol, matrix or area code symbol or stacked code symbol. The optical reader 92 may take the form of a scanner type optical reader or an imager type optical reader. The scanner type optical reader may include scan engine, for example including a light source, for instance a laser diode and an oscillating mirror or rotating prism to scan a beam of light produced by the light source across a machine-readable symbol. The scanner type optical reader may also include an optical sensor, for instance, a photodiode to capture a scan profile returned from the illuminated machine-readable symbol. The imager type optical reader may include a light source, for example, a flood illumination system, including for instance one or more light emitting diodes (LEDs) to illuminate a machine-readable symbol. The imager type optical reader may also include an image sensor, for example a one- or two-dimensional array of charge coupled devices (CCDs) to capture an image of light returned from the illuminated machine-readable symbol. The scanner and/or imager type optical readers may also include one or more optical components such as mirrors, lenses, filters, apertures, etc. located in an outward or an inward light path. Suitable optical readers and components thereof are commercially available from a variety of sources, for instance Intermec Technologies.

Also for example, mobile computing device or client 12 may include an RFID reader or interrogator 94 and associated antenna 95. The RFID reader or interrogator 94 may be configured to transmit interrogation signals and receive responses from RFID transponders or tags. RFID reader or interrogators 94 and components thereof are commercially available from a variety of sources, for instance Intermec Technologies.

The mobile computing device or client 12 may include one or more slots configured to receive removable storage media. For example, the mobile computing device 12 may include a plug in card slot 96 configured to receive a plug in card 52 (e.g., memory card as secure digital (SD) cards or cards having form factors identical or similar to mini PCI cards or PCMCIA cards, or wireless communications card, etc.) and to communicatively couple the plug in card 52 to one or more of the buses 84.

Figure 3A:
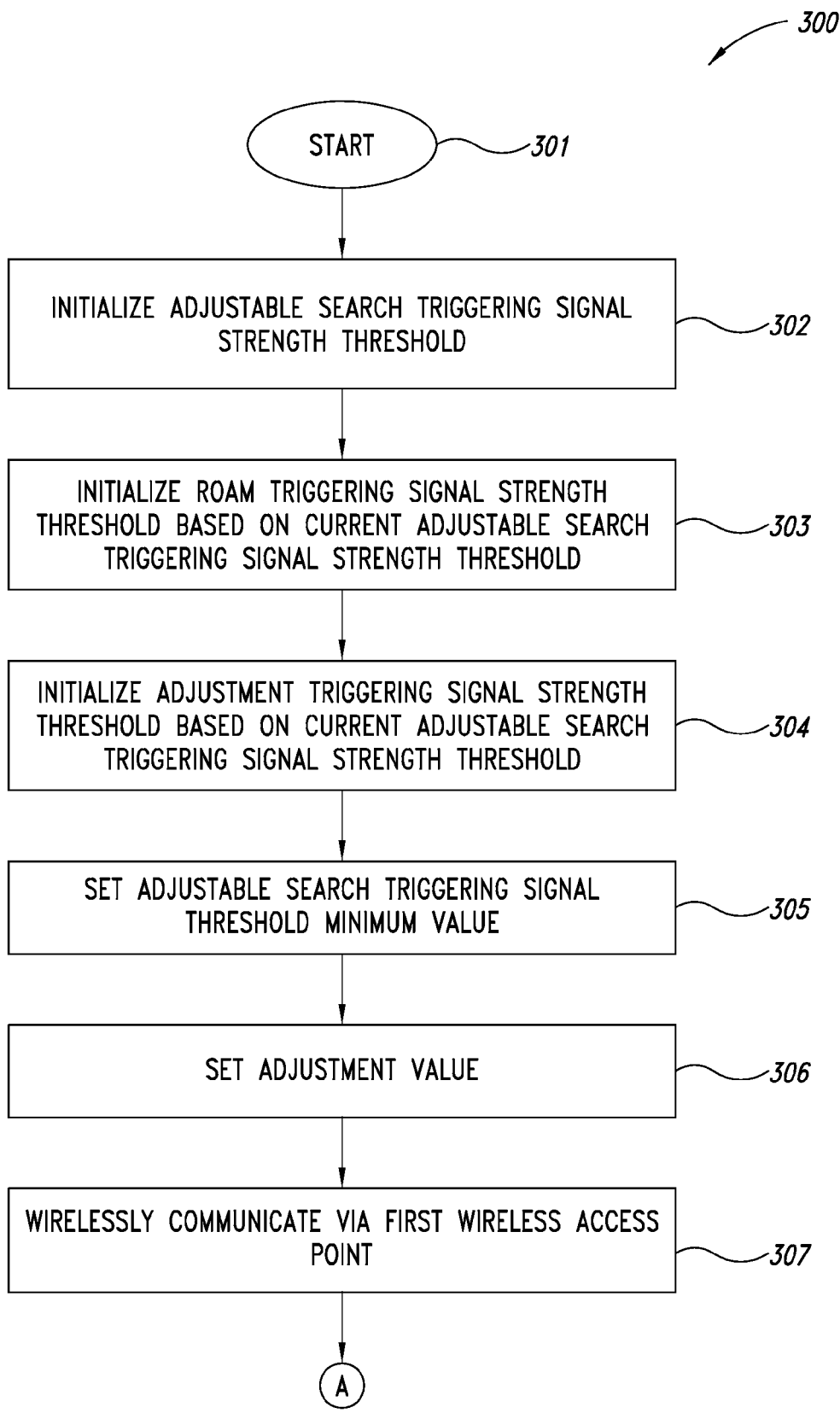
FIGS. 3A and 3B are a flow diagram showing a method of providing dynamically configured wireless communications, according to one illustrated embodiment.
Figure 3B:
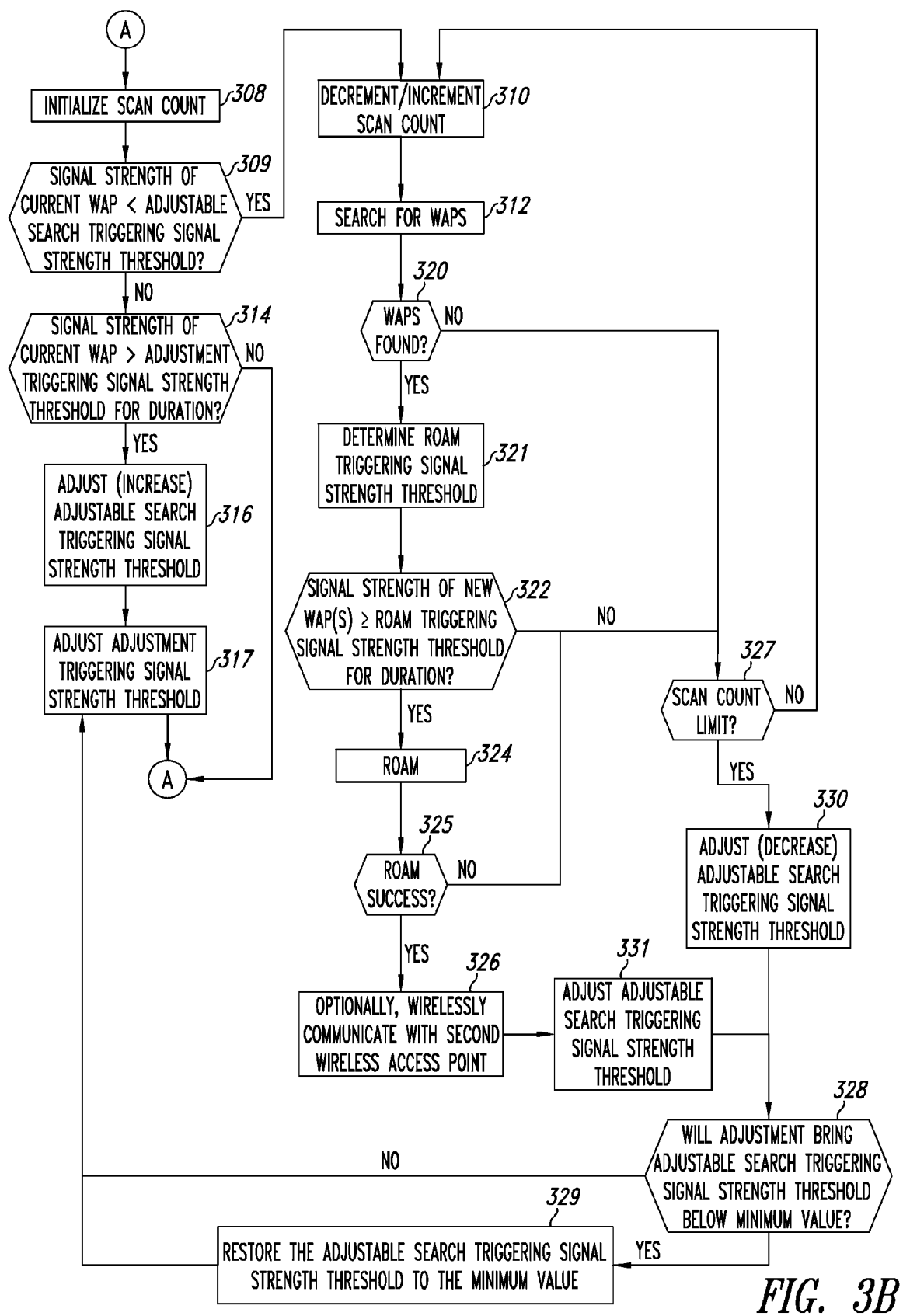

FIGS. 3A-3B show a method 300 of providing dynamically configured wireless communications, according to one illustrated embodiment. While described in terms of operation of a processor, the method 300 may be implemented by any hardware, for instance hardwired logic (e.g., programmable gate array, field programmable gate array, application specific integrated circuit, etc.) or by structures other than a processor executing instructions stored as software or firmware in a storage medium (e.g., ROM, RAM, Flash, etc.).

The method 300 starts at 301, for example, upon activation of a mobile computing device or client 12 (FIG. 1), or upon a mobile computing device 12 (FIG. 1) entering a wireless environment 10 (FIG. 1).

At 302, a processor initializes an adjustable search triggering signal strength threshold. The adjustable search triggering signal strength threshold is an adjustable threshold that sets a limit for when a signal strength of a current WAP 14 as detected by a mobile computing device or client 12 is sufficiently low as to trigger a search or scan for a new WAP 14 with a stronger signal strength. The adjustable search triggering signal strength threshold may be initialized to some default value (e.g., −70 dBm). The default value may, for example, be a manufacturer configured value, user configured value or a company or enterprise configured value.

At 303, the processor initializes a roaming margin. The roaming margin sets a limit for when a roam or roaming operation should be performed. As noted previously, roaming takes the form of attempting either passively or actively to establish wireless communications with another WAP or reestablish wireless communications with the current WAP 14. The roam operation may, or may not, be successful. The roaming margin may ensure that roaming is not attempted when only a minimal increase in signal strength may be gained, thereby avoiding unnecessary switching back and forth between WAPs, commonly referred to as thrashing. The roaming margin may be initialized to a default value, which may be manufacturer configured, user configured or company or enterprise configured. For example, the roaming margin may be initialized to a defined amount or percentage above the signal strength of a current WAP. The roaming margin may, for example be 5 to 10 dB. Thus, for example, if the roaming margin is 5 dB and the signal strength of a current WAP is −65 dBm, data from a new WAP 14 must be received with a signal strength of at least −60 dBm before the new WAP 14 is considered a candidate for a roam operation.

At 304, a processor initializes an adjustment triggering signal strength threshold. The adjustment triggering signal strength threshold sets a limit for when the adjustable search triggering signal strength threshold should be adjusted. For example, the adjustment triggering signal strength threshold may set a limit for determining when the adjustable search triggering signal strength threshold should be increased. Such may ensure that when the signal strength of a current WAP consistently exceeds the adjustable search triggering signal strength threshold by a significant margin, the adjustable search triggering signal strength threshold is raised to reduce that margin, making it possible to find a more appropriate adjustable search triggering signal strength threshold as the mobile computing device or client moves into a high coverage area. The adjustment triggering signal strength threshold may be initialized based on a current value of the adjustable search triggering signal strength threshold. For example, the adjustment triggering signal strength threshold may be initialized to a default value or to an amount or percentage above the current value of the adjustable search triggering signal strength threshold.

At 305, the processor sets a minimum value for the adjustable search triggering signal strength threshold. The minimum value may be set to a default value which may be a manufacturer configured value, user configured value or a company or enterprise configured value. The minimum value may take a variety of forms, for example an amount (e.g., dB) and may take a variety of magnitudes.

At 306, the processor sets an adjustment value by which the adjustable search triggering signal strength threshold may be adjusted. The adjustment value may be set to a default value which may be a manufacturer configured value, user configured value or a company or enterprise configured value. The adjustment value may take a variety of forms, for example an amount (e.g., dB) or a percentage (e.g., %), and may take a variety of magnitudes (e.g., 3 dB, 50%).

At 307, wireless communication is established between the mobile computing device or client 12 and a first one of the WAPs 14. The first WAP is thus considered the current WAP with which the mobile computing device or client 12 is wirelessly communicating. Establishing wireless communications with the first WAP may occur without regard to the adjustable search triggering signal strength threshold. Any time that wireless communications cannot be established with any WAP due to insufficient signal strength the processor returns control to 307 until such time that wireless communications with a WAP can be established.

At 308, the processor initializes a scan count. The scan count may be used to track a total number of searches or scans made on viable communications channels for a new WAP.

The scan count may be used to count up or count down. The scan count may be initialized to a default value for example 0 when used to count up or 2 when used to count down, although other values may be employed.

At 309, a signal strength of the current WAP 14 as measured or otherwise detected at the mobile computing device or client 12 is compared to the adjustable search triggering signal strength threshold. The signal strength represents how well the mobile computing device or client 12 is wirelessly receiving from the particular WAP 14 with which it is currently communicating (i.e., current WAP). Typically, the signal strength is measured as a running average on the signal strength of each beacon received from the current WAP 14. If the signal strength of the current WAP is less than the adjustable search triggering signal strength threshold, control passes to 310. Otherwise, control passes to 314.

At 310, the scan count is adjusted, for example the scan count may be decremented if counting down or incremented if counting up. At 312, a search or scan for WAPs is performed. Searching or scanning is a method by which a mobile computing device or client 12 locates a WAP 14 with a better signal strength in order to roam. Searching or scanning may be performed either actively (i.e., where the mobile computing device or client 12 must receive data before transmitting) or passively (i.e., where the mobile computing device or client 12 may transmit data before receiving data). Either active or passive searching or scanning may be employed. The search for WAPs 312 may include searching one, more or all viable communications channels. A suitable approach for searching or scanning various channels is set out as method 400 (FIG. 4) and some suitable protocols for dividing the communications channels for searching or scanning are set out as method 500 (FIG. 5) and as method 600 (FIG. 6). Control then passes to 320.

While not illustrated, a hibernation may occur when a mobile computing device or client 12 cannot receive any frames from any WAP with a sufficiently high signal strength to maintain a wireless connection. Hibernation may incur slowing down a rate at which searching or scanning occurs, which may conserve power, for example battery power. Aggressive searching or scanning is a nearly constant activity that can consume significant amounts of power. During hibernation, searching or scanning may be suspended for a defined amount of time (e.g., 20 seconds or more). The amount of time of suspension may be specified by the manufacturer, user or company or enterprise.

At 314, the signal strength of the current WAP is compared to the adjustment triggering signal strength threshold. If the signal strength of the current WAP is greater than the adjustment triggering signal strength threshold for a given duration, the adjustable search triggering signal strength threshold is adjusted at 316. If the signal strength of the current WAP 14 is not greater than the adjustment triggering signal strength threshold for the duration, control returns to 308.

At 316, the adjustable search triggering signal strength threshold is adjusted, for example being increased. For instance, the adjustable search triggering signal strength threshold may be increased to a value that is an average of the sum of the current adjustable search triggering signal strength threshold and the current signal strength. For instance, if the current adjustable search triggering signal strength threshold is −70 dBm, and the adjustment triggering signal strength threshold is −63 dB, and the current signal strength remains above −63 dBm for a defined duration (e.g., three seconds), the adjustable search triggering signal strength threshold is increased. If the current signal strength is −60 dBm, the new adjustable search triggering signal strength threshold is −65 dBm, that is the average of the current adjustable search triggering signal strength threshold −70 dBm and the current signal strength −60 dBm. As noted above, such may ensure that when the signal strength of a current WAP consistently exceeds the adjustable search triggering signal strength threshold by a significant margin, the adjustable search triggering signal strength threshold is raised to reduce that margin, making it possible to find a more appropriate adjustable search triggering signal strength threshold as the mobile computing device or client moves into an area with higher coverage than the LAN 26. Control then passes to 317.

At 320, it is determined whether additional WAPs 14 have been found. If additional WAPs 14 have been found, the roam triggering signal strength threshold is determined at 321.

At 321, the roam triggering signal strength threshold is determined. For example, the roam triggering signal strength threshold may be determined by adding the roaming margin to the current signal strength (i.e., signal strength of the current WAP).

At 322, the signal strength of the new WAP(s) 14 is (are) compared to a roam triggering signal strength threshold. If the signal strength of the new WAP(s) 14 is not at least equal to the roam triggering signal strength threshold for some given duration, control passes to 327. If the signal strength of the new WAP(s) 14 is at least equal to the roam triggering signal strength threshold for some given duration, a roam operation is performed at 324.

At 325 it is determined whether the roam operation 324 was successful. If the roam operation 324 was successful, wireless communications may be established with a new, second WAP 14 as indicated at 326. Otherwise, wireless communications may be reestablished with the current, first WAP 14, and control passes to 327.

At 326, the processor establishes wireless communications with the new WAP 14 that was found to have the best signal strength. Control then passes to 331.

At 331, the adjustable search triggering signal strength threshold is adjusted. The adjustable search triggering signal strength threshold may be set based upon the new current signal strength for the new WAP connection and the roaming margin. For example if the new current signal strength is −57 dBm and the roaming margin is 7 dB the adjustable search triggering signal strength threshold may be set the current signal strength minus the roaming margin, −64 dBm.

At 327 the scan count is compare to a scan count limit. For example the scan count may be compared to 0 when counting down or to 2 when counting up. If the scan count is not at the scan count limit, control returns to 310 for another iteration of the search or scan process. Otherwise control passes to 330.

At 330, the adjustable search triggering signal strength threshold is adjusted. Such adjustment may ensure that when the same signal strength remains at or below the adjustable search triggering signal strength threshold for a short time without discovering a WAP 14 with sufficient strength to justify a roam operation, the adjustable search triggering signal strength threshold is reduced to avoid wasting time and resources searching or scanning for new WAPs 14 without a positive outcome. For example, the adjustable search triggering signal strength threshold may be decreased by an adjustment value, for example the adjustment value set at 306. Control then passes to 328.

At 328, the processor determines whether a recent adjustment to the adjustable search triggering signal strength threshold has reduced that threshold below a minimum value, for example the minimum value set at 305. If an adjustment has reduced the adjustable search triggering signal strength threshold below the minimum value, the adjustable search triggering signal strength threshold is restored to the minimum value (e.g., the minimum value set at 305). Control then passes to 317. Employing a minimum value or "floor" ensures that that all searching or scanning will not be "disabled" when the mobile computing device or client 12 is taken outside the coverage area of the LAN 26. If the adjustments have not brought the adjustable search triggering signal strength threshold below the minimum value, control passes to 317.

At 317, the adjustment triggering signal strength threshold is adjusted based on the current adjustable search triggering signal strength threshold. For example, the adjustment triggering signal strength threshold may be set equal to an average of the current signal strength and the current signal search triggering strength threshold. For example, if the current signal search triggering strength threshold is −70 dBm, and the current signal strength is −60 dBm, the new adjustment triggering signal strength threshold may be an average of −70 dBm and −60 dBm, or −65 dBm. Control then returns to 308.

The method 300 or portions thereof may be continually executed while the mobile computing device or client 12 is operating or while the mobile computing device or client 12 is in the wireless communication environment 10. The method 300 may executed sequentially or concurrently (e.g., as separate threads in a multi-threaded process) with other methods. Portions of the method 300 may execute sequentially or concurrently (e.g., as separate threads in a multi-threaded process) with other portions of the method 300 on a single processor, a multi-core processor or on multiple processors.

The method 300 provides a number of possible advantages. For example, the method 300 lowers the threshold that triggers searching or scanning where coverage is weak, thereby improving overall performance in such areas. The method 300 raises the threshold that triggers searching or scanning in areas where coverage is strong, thereby improving overall performance in such areas. Dynamically adjusting the threshold that triggers searching or scanning may provide the best overall performance in a mixed coverage environment. The method 300 may also enable easy deployment of highly efficient algorithm without regard to the specific destination's coverage environment. Of course, sufficient coverage and minimizing interference will increase effectiveness, however the method 300 may help adapt to an ever changing wireless environment. The method 300 may also advantageously limit thrashing, since there will generally be a period of time after a roam, before further searching or scanning occurs. Without scanning, no new data will be available for a roaming algorithm to act on, thus two quick back-to-back roam events should not occur.

Figure 4:
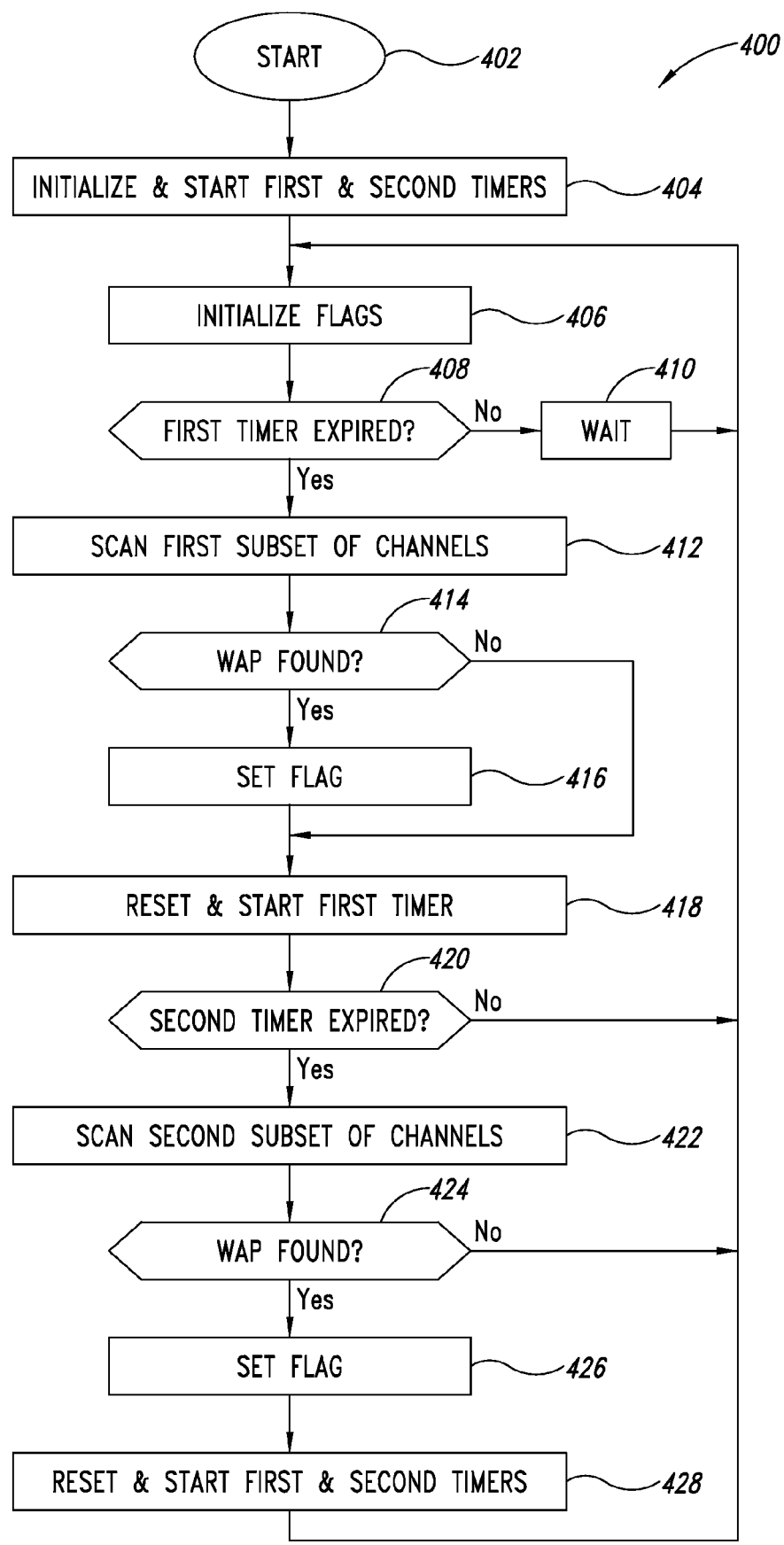
FIG. 4 is a flow diagram showing a method of searching or scanning for wireless access points, according to one illustrated embodiment.

FIG. 4 shows a method 400 of searching or scanning for additional WAPs 14. The method 400 may be suitable for performing the search for additional WAPs 312 of the method 300 (FIGS. 3A, 3B). The method 400 advantageously search or scans channels grouped in two subsets, a respective scan rates or frequencies. Thus, a first subset of channels may be scanned more frequently than a second subset of channels. Other embodiments may employ more than two subsets of channels.

The method 400 starts at 402, for example, in response to a function call from the method 300. The method 400 may be run sequentially or concurrently with the method 300, for example as separate threads in a multi-threaded process, which may execute on a single processor, a multi-core processor or on multiple processors.

At 404, a first timer and second timer are initialized and started. The first timer is used to implement a first scan rate for a first subset of channels, while the second timer is used to implement a second scan rate for a second subset of channels. As noted above, some embodiments may employ additional subsets of channels, hence additional timers may be employed in a similar fashion to the first and second timers.

At 406, one or more flags are initialized. The one or more flags may be used to indicate when a WAP 14 has been found.

At 408, a processor determines whether a first timer has expired. If the first timer has not expired, a wait loop is executed at 410. If the first timer has expired, the processor scans a first set of subchannels at 412. At 414, the processor determines whether a WAP 14 is found. If a WAP 14 has been found, the processor sets one of the flags at 416 to indicate such, and control passes to 418. If a WAP 14 has not been found, control passes directly to 418 without setting a flag. At 418, the processor resets and starts the first timer.

At 420, the processor determines whether a second timer has expired. If the second timer has not expired, control returns to 406. If the second timer has expired, the processor scans a second subset of channels at 422. At 424, the processor determines whether a WAP was found. If a WAP was found, the processor sets a flag at 426, to indicate such, and control passes to 428. If a WAP was not found, control returns to 406. At 428, the processor resets and restarts the first and second timers and returns control to 406 to perform another iteration.

Figure 5:
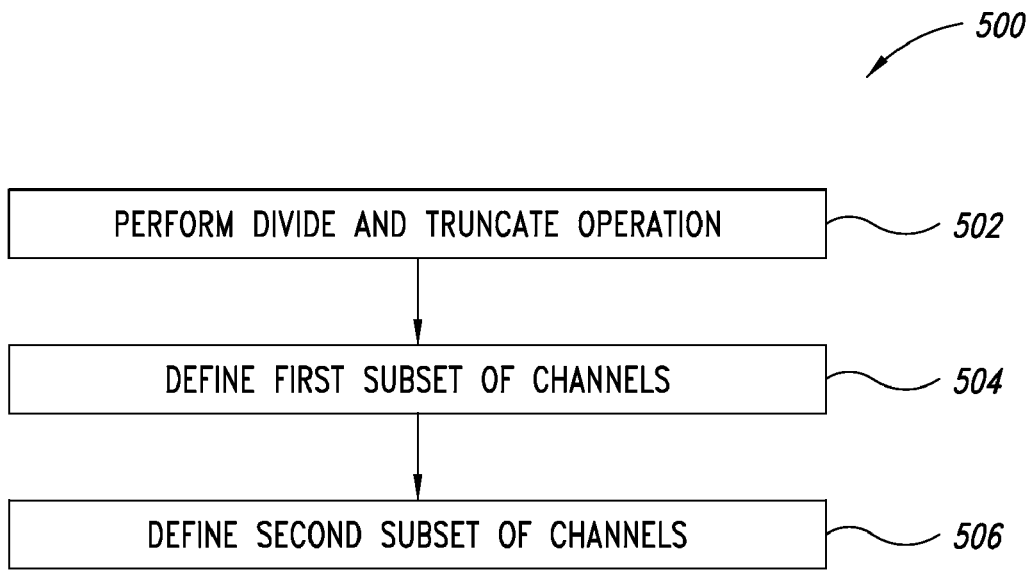
FIG. 5 is a flow diagram showing a method of forming subsets of communications channels to be searched or scanned, according to one illustrated embodiment.
Figure 6:
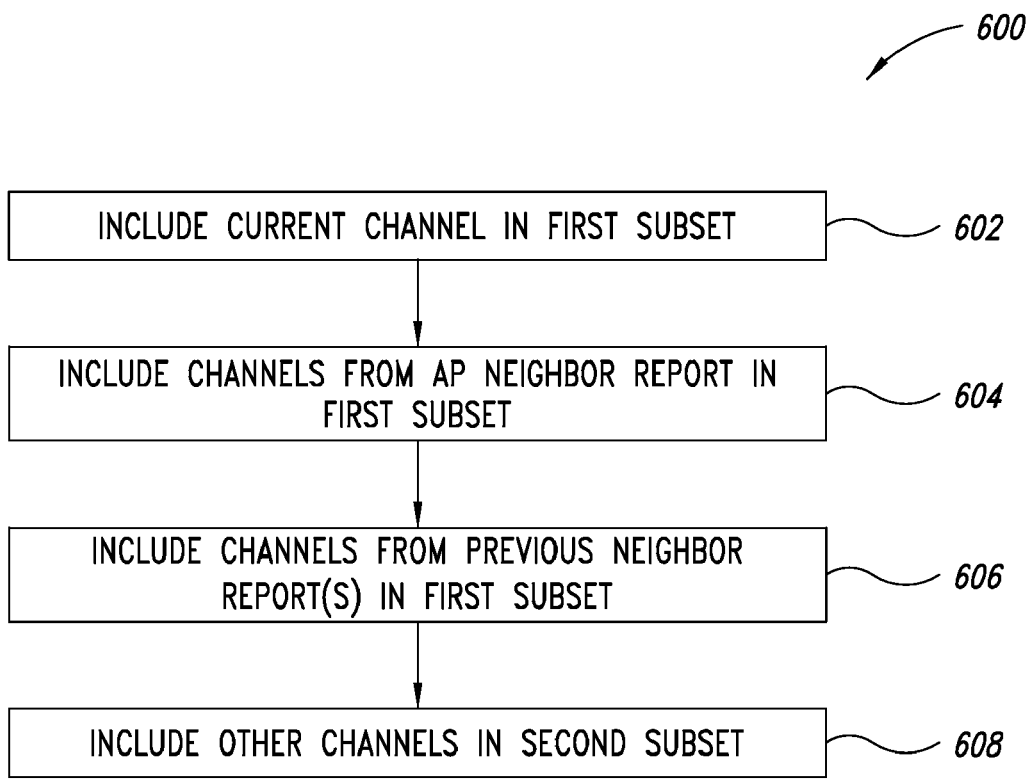
FIG. 6 is a flow diagram showing a method of forming subsets of communications channels for searching or scanning, according to another illustrated embodiment.

FIG. 5 shows a method 500 of forming subsets of communications channels, according to one illustrated embodiment. The method 500 may be useful in performing the search or scan 314 (FIGS. 3A, 3B) or the method 400 (FIG. 4). The method 500 divides the total number of available channels into two subsets for the purpose of scanning at respective scan rates. For example, in a typical FCC 802.11 6/g compliant infrastructure, there are 11 channels possible, however only 3 of those channels are ever in use. Scanning only those 3 channels increases efficiency and reduces power consumption. To maintain adaptability, the remaining channels should be scanned at some lower scan rate.

At 502, a processor performs a divide and truncate operation on the total number of available communications channels. For example, the processor may perform a divide by 3 and truncate operation. For instance, where there are 11 channels (e.g., FCC 802.11 6/g) a divide by 3 and truncate operation results in a value of 3, where there are 13 channels (e.g., ETSI 6/g) a divide by 3 and truncate results in a value of 4, and where there are 20 channels (e.g., FCC 802.11 a/6/g) a divide by 3 and truncate operation results in a value of 6. This sets the size of the first subset or the total number of channels to be scanned at the higher scan rate. This may also inherently set the size of the second subset or total number of channels to be scanned at the lower scan rate, if there are only two subsets of channels.

At 504, the processor defines a first subset of channels including a number of available communications channels where the total number is set by the divide and truncate operation. At 506, the processor defines a second subset of communications channels. The second set may include all of the available channels that are not assigned to the first subset.

FIG. 6 shows a method 600 of forming subsets of communications channels, according to another illustrated embodiment. The method 600 may be useful in performing the searching 314 of the method 300 (FIGS. 3A, 3B) or the method 400 (FIG. 4). The method 600 may be particularly useful where WAP neighbor reports are available. Scanning only a subset of all available channels increases efficiency and reduces power consumption. However, to maintain adaptability, the remaining channels should be scanned at some lower scan rate.

At 602, a processor includes a current channel in a first subset of available communications channels to be scanned at a first scan rate. This ensures that the current channel will always be in the first subset which is scanned more frequently than a second subset of the communications channels.

At 604, the processor includes all channels identified in an AP neighbor report in the first subset of available communications channels along with the current channel. The channels identified in the AP neighbor report may be listed sequentially after the current channel in the first subset to ensure that the current channel is the first one scanned in each iteration. The size of the first subset is thus one greater than the number of channels identified in the AP neighbor report to ensure that the current channel is included in the first subset.

Optionally at 606, the processor may include channels from one or more previous WAP neighbor reports in the first subset of channels. Such may compensate for the fact that AP neighbor reports do not always list all of the neighbor WAPs 14. Thus, the processor may track the previous WAP neighbor reports.

At 608, the processor includes all other available communications channels in a second subset of available communications channels, to be scanned at a second scan rate, slower than the first scan rate.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other communications systems, not necessarily the exemplary ADC based wireless communications systems generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The methods set out herein may include additional acts or steps, may omit some acts or steps, and/or may perform acts or steps in a different order than illustrated, unless noted otherwise. The methods set out herein may execute sequentially or concurrently, and may execute on a single processor, on separate cores of a single processor or on separate processors.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of providing dynamically updated wireless communications, the method comprising:
   determining if a signal strength of a current wireless access point with which wireless communications is established is below an adjustable search triggering signal strength threshold;
   searching for any additional wireless access points if the signal strength of the current wireless access point is determined to be below the adjustable search triggering signal strength threshold;
   determining if a signal strength of at least one new wireless access point located by the searching is at least equal to a roam triggering signal strength threshold;
   roaming if the signal strength of the at least one new wireless access point located by the searching is at least equal to the roam triggering signal strength threshold; and
   adjusting the adjustable search triggering signal strength threshold if no new wireless access point has a signal strength that is at least equal to the roam triggering signal strength threshold.

2. The method of claim 1 wherein adjusting the adjustable scanning signal strength threshold if no new wireless access point has a signal strength that is at least equal to the roam triggering signal strength threshold includes decreasing the adjustable search triggering signal strength threshold.

3. The method of claim 1, further comprising:
   setting the roam triggering signal strength threshold based on the signal strength of the current wireless access point.

4. The method of claim 3 wherein setting the roam triggering signal strength threshold based on the signal strength of the current wireless access point includes setting the roam triggering signal strength threshold at a defined roaming margin above the signal strength of the current wireless access point.

5. The method of claim 1, further comprising:
    determining whether adjusting the adjustable search triggering signal strength threshold will make the adjustable search triggering signal strength threshold less than a defined minimum adjustable search triggering signal strength threshold value, wherein adjusting the adjustable search triggering signal strength threshold if no new wireless access point has a signal strength that is at least equal to the roam triggering signal strength threshold includes decreasing the adjustable search triggering signal strength threshold only if the decreasing will not make the adjustable search triggering signal strength threshold less than the defined minimum adjustable search triggering signal strength threshold value.

6. The method of claim 1 wherein adjusting the adjustable scanning signal strength threshold if no new wireless access point has a signal strength that is at least equal to the roam triggering signal strength threshold includes adjusting the adjustable search triggering signal strength threshold if no new wireless access point has a signal strength that is at least equal to the roam triggering signal strength threshold over a first duration.

7. The method of claim 1, further comprising:
    determining if a signal strength of the current wireless access point is at least equal to an adjustment triggering signal strength threshold; and
    adjusting the adjustable search triggering signal strength threshold if the signal strength of the current wireless access point is at least equal to the adjustment triggering signal strength threshold.

8. The method of claim 7 wherein adjusting the adjustable search triggering signal strength threshold if the signal strength of the current wireless access point is at least equal to the adjustment triggering signal strength threshold includes increasing the adjustable search trigger signal strength threshold if the signal strength of the current wireless access point is at least equal to the adjustment triggering signal strength threshold.

9. The method of claim 7, further comprising:
    setting the adjustment triggering signal strength threshold based on a current value of the adjustable search triggering strength threshold.

10. The method of claim 7 wherein adjusting the adjustable search triggering signal strength threshold if the signal strength of the current wireless access point is at least equal to the adjustment triggering signal strength threshold includes adjusting the adjustable search trigger signal strength threshold if the signal strength of the current wireless access point is at least equal to the adjustment triggering signal strength threshold over a second duration.

11. The method of claim 1, further comprising:
    wirelessly communicating with a first wireless access point as the current wireless access point before roaming; and
    wirelessly communicating with a second wireless access point as the current wireless access point after roaming.

12. The method of claim 1 wherein searching for any additional wireless access points if the signal strength of the current wireless access point is determined to be below the adjustable search triggering signal strength threshold includes scanning for additional wireless access points.

13. The method of claim 12 wherein scanning for additional wireless access points includes scanning a first subset of available channels at a first rate.

14. The method of claim 13 wherein scanning for additional wireless access points includes scanning a second subset of available channels at a second rate, lower than the first rate.

15. The method of claim 14, further comprising:
    performing a divide and truncate operation on the total number of available channels to define the size of at least the first and the second subsets.

16. The method of claim 14, further comprising:
    performing a divide by 3 and truncate operation on the total number of available channels to define the size of at least the first and the second subsets.

17. The method of claim 13, further comprising:
    including the one of the available channels that is currently used for wireless communications in the first subset.

18. The method of claim 17, further comprising:
    including a number of the available channels identified in an access point neighbor report in the first subset.

19. A wireless communications system, the system comprising:
    at least one antenna;
    at least one transmitter communicatively coupled to the at least one antenna;
    at least one receiver communicatively coupled to the at least one antenna;
    at least one control system communicatively coupled to the at least one transmitter and the at least one receive, the control system that dynamically updates wireless communications by:
        determining if a signal strength of a current wireless access point with which wireless communications is established is below an adjustable search triggering signal strength threshold;
        searching for any additional wireless access points if the signal strength of the current wireless access point is determined to be below the adjustable search triggering signal strength threshold;
        determining if a signal strength of at least one new wireless access point located by the searching is at least equal to a roam triggering signal strength threshold;
        roaming if the signal strength of the at least one new wireless access point located by the searching is at least equal to the roam triggering signal strength threshold; and
        decreasing the adjustable search triggering signal strength threshold if no new wireless access point has a signal strength that is at least equal to the roam triggering signal strength threshold.

20. The wireless communications system of claim 19 wherein the control system dynamically updates wireless communications further by:
    setting the roam triggering signal strength threshold at a defined first margin above a current value of the adjustable search triggering strength threshold.

21. The wireless communications system of claim 19, further comprising:
    setting the adjustable search triggering signal strength threshold to the defined minimum adjustable search triggering signal strength threshold value if adjustment of the adjustable search triggering signal strength threshold brings the adjustable search triggering signal strength threshold below the defined minimum adjustable search triggering signal strength threshold value.

22. The wireless communications system of claim 19 wherein the control system dynamically updates wireless communications further by:
    determining if a signal strength of the current wireless access point is at least equal to the an adjustment triggering signal strength threshold; and increasing the adjustable search triggering signal strength threshold if the signal strength of the current wireless access point is at least equal to the adjustment triggering signal strength threshold.

23. The wireless communications system of claim 19 wherein the control system dynamically updates wireless communications further by:
setting the roam triggering signal strength threshold at a defined second margin above the current value of the adjustable search triggering strength threshold.

24. The wireless communications system of claim 19 wherein the control system dynamically updates wireless communications further by:
performing a divide and truncate operation on the total number of available channels to define the size of at least the first and the second subsets.

25. The wireless communications system of claim 19 wherein the control system dynamically updates wireless communications further by:
including the one of the available channels that is currently used for wireless communications in the first subset; and
including a number of the available channels identified in an access point neighbor report in the first subset.

26. The wireless communications system of claim 19 wherein the control system includes at least one processor and at least one processor-readable storage medium that stores processor executable instructions to configure the processor.

* * * * *

UNITED STATES PATENT AND TRADEMARK OFFICE
CERTIFICATE OF CORRECTION

| | | |
|---|---|---|
| PATENT NO. | : 8,014,354 B2 | Page 1 of 1 |
| APPLICATION NO. | : 12/253678 | |
| DATED | : September 6, 2011 | |
| INVENTOR(S) | : John Eichenberger et al. | |

It is certified that error appears in the above-identified patent and that said Letters Patent is hereby corrected as shown below:

Column 16, Line 24:
"at least one transmitter and the at least one receive, the" should read, --at least one transmitter and the at least one receiver, the--.

Column 16, Line 66:
"access point is at least equal to the an adjustment triggering" should read, --access point is at least equal to the adjustment triggering--.

Signed and Sealed this

Thirty-first Day of January, 2012

David J. Kappos
*Director of the United States Patent and Trademark Office*